United States Patent

[11] 3,556,428

[72] Inventor Frederick C. Hayler
 75 Zoutpansberg Road, Pretoria,
 Republic of South Africa
[21] Appl. No. 663,601
[22] Filed Aug. 28, 1967
[45] Patented Jan. 19, 1971
[32] Priority Sept. 1, 1966, Dec. 14, 1966
[33] Republic of South Africa
[31] Nos. 66/5317 and 66/7569

[54] ARTICLES FOR INHIBITING ENTANGLING OF A FISHING LINE ON A FISHING LINE REEL
 4 Claims, 5 Drawing Figs.
[52] U.S. Cl. ................................................. 242/84.52
[51] Int. Cl. ................................................... A01k 89/02
[50] Field of Search .......................................... 242/156.1, 84.52, 84.53, 65(Cursory)

[56] References Cited
 UNITED STATES PATENTS

| | | | |
|---|---|---|---|
| 567,743 | 9/1896 | Griffith | 242/156.1 |
| 699,763 | 5/1902 | Mathews | 242/84.53 |
| 1,299,959 | 4/1919 | Keyser | 242/84.53 |
| 1,960,491 | 5/1934 | Johnson | 242/84.52 |
| 2,257,521 | 9/1941 | Babcock | 242/84.53 |
| 2,477,073 | 7/1949 | McGill | 242/84.53 |
| 2,489,432 | 11/1949 | Peters | 242/156.1 |
| 2,546,776 | 3/1951 | Peterson | 242/84.53 |
| 2,600,939 | 6/1952 | Torrence | 242/84.53 |
| 2,976,017 | 3/1961 | LeBus, Sr. | 242/156.1X |
| 2,985,398 | 5/1961 | Rockstrom et al. | 242/65 |

Primary Examiner—Billy S. Taylor
Attorney—Holman, Glascock, Downing and Seebold

ABSTRACT: A device for inhibiting the tangling of fishing line windings on a spool of a reel in which a cylinder having a resilient surface of an expanded resilient substance extends in contact across the full width of the windings and spring means freely rotatably mount the cylinder and are adapted for connection to the reel and for pressing the resilient surface against the windings when connected to the wheel. The spring means include wire sections for locating and pressing the resilient surface against the windings with the sections being formed as a pair of bellcranks. The cylinder is rotatably connected near the ends of corresponding two arms of the bellcranks to one side of the pivots and the corresponding two arms of the bellcranks to the other side of the pivot being connected and adjustably located by means allowing variation of the pressure of the resilient surface against the windings.

PATENTED JAN 19 1971 3,556,428
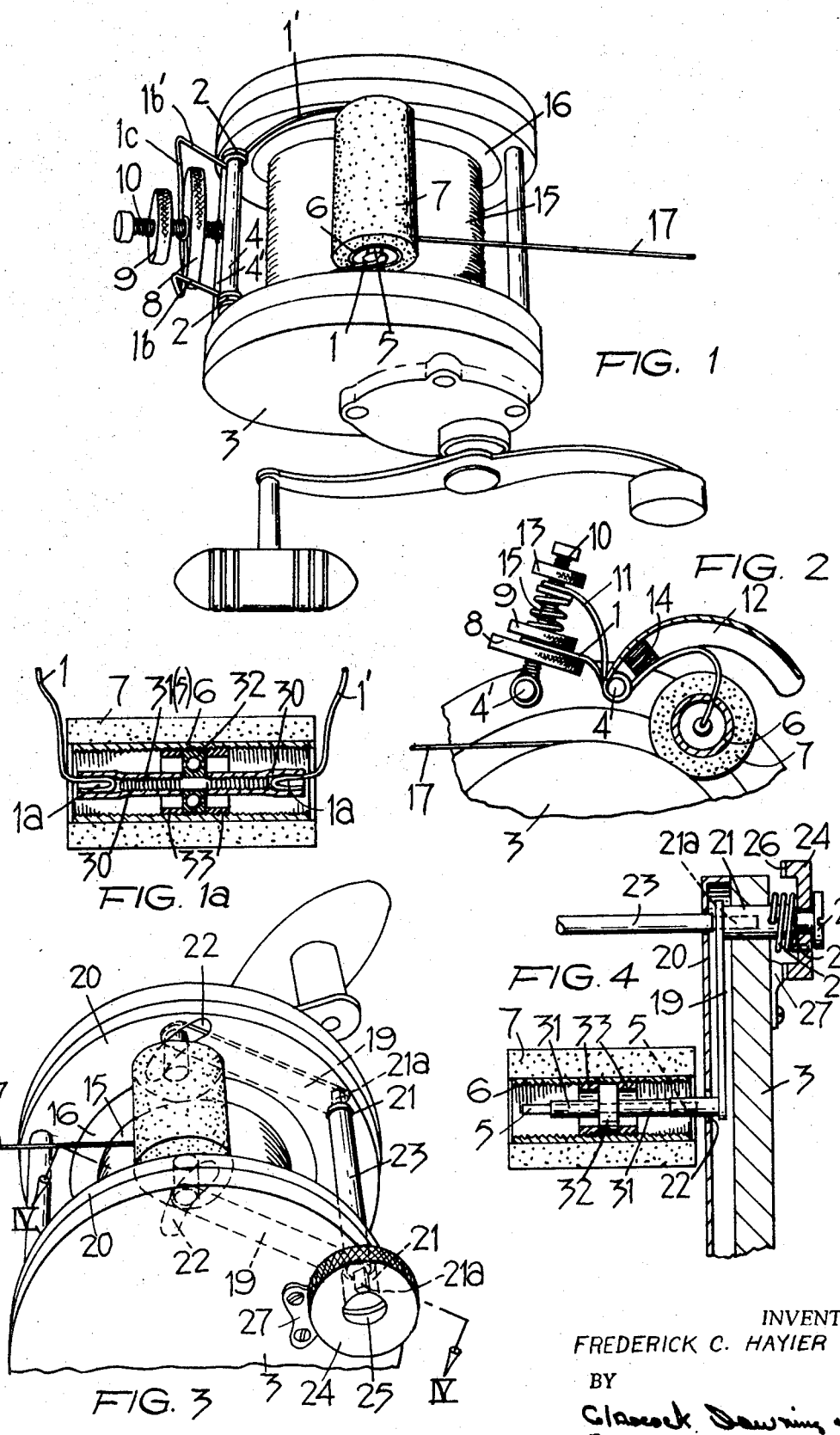
INVENTOR.
FREDERICK C. HAYIER

ARTICLES FOR INHIBITING ENTANGLING OF A FISHING LINE ON A FISHING LINE REEL

BACKGROUND OF THE INVENTION

This invention concerns improvements in or relating to fishing line reels, more specifically of the type in which the line spool itself rotates, such as are commonly affixed to fishing and angling rods.

The invention may be used advantageously with so-called multiplying reels (reels in which the spool is geared to winding handles so as to turn faster) and with reels in which the handle is directly connected to the spool, both being in wide use by anglers.

The problem that many fishermen and especially novices experience when casting is that the spool overruns due to its inertia or that there is a backlash in the line, both or either of these circumstances usually resulting in an entangled line. Also, thin line is apt to enter and jam between the housing and the spool of the reel under these circumstances. The thumb control which is used by deft fishermen requires a good deal of skill and practice, and momentary inattention, or inexperience in the case of novices, often results in the loss of line and fishing time. Also any form of braking, including thumb control, absorbs energy thus reducing the efficiency of the cast.

It is an object of this invention to provide articles for inhibiting entangling of a fishing line on a fishing line reel, thus overcoming or mitigating these problems.

SUMMARY OF THE INVENTION

An article in accordance with this invention for inhibiting tangling of a fishing line on a fishing line reel comprises a cylindrical body having a resilient surface, freely rotatably mounted by a spring-loaded means for flexibly pressing the resilient surface against the fishing line windings on the reel spool, the length of the cylindrical body extending across the full width of the said windings.

The article in accordance with the invention may be provided either in the form of an attachable accessory to a fishing line reel, or permanently fixed within the body of the fishing line reel.

The forces during casting of centrifugal action on the windings and of momentum of the spool normally cause the line to "clock spring" or in other words loosen up from below; also jerkiness in casting action would cause line backlash; both these would usually cause a tangled line on the spool of the reel.

The light rotatable pressure of the cylindrical body enables the line to be pulled off freely from the spool, by nevertheless trapping the windings on the spool so as to inhibit their rotation, relative to each other and to the spool. Thus maintaining tightly-wound or comparatively tightly-wound windings on the spool. The line thus jets out at a tangent from the spool during casting, and by correct positioning of the cylindrical body is directed straight at the first lead eye (or ring) of the fishing rod, thus reducing line drag at this point.

BRIEF DESCRIPTION OF THE DRAWINGS

In FIG. 1 of the drawings an article for inhibiting entangling of a fishing line on a fishing line reel which is provided in the form of an attachable accessory to a fishing line reel is illustrated in perspective view duly attached to a fishing line reel.

In FIG. 1a the cylindrical body of the article is illustrated in axial section.

In FIG. 2 a modification of the article illustrated in FIG. 1 to which has been added a shield and damping pad, is illustrated in part sectional side elevation.

In FIG. 3 an article for inhibiting the entangling of a fishing line on a fishing line reel which is fixed into the body of the fishing line reel is illustrated in perspective view.

In FIG. 4 the article shown in FIG. 3 is illustrated in part sectional elevation on section IV–IV of FIG. 3.

DESCRIPTION OF THE PREFERRED EMBODIMENTS

As shown in FIG. 1 of the accompanying drawings an article in accordance with the preferred embodiment of the invention comprises spring wire elongate elements 1 and 1' formed substantially to the shape of a pair of bellcranks pivotally mounted on a reel 3 by means of wire coils 2 which encircle a post 4 of the reel 3. A shaft 5 is connected near the ends of corresponding arms 1 and 1' of the bellcrank shapes, and freely rotatably carries a cylindrical body in the form of a rigid cylinder 6 carrying a soft resilient surface 7 which advantageously comprises an expanded resilient substance, for example an expanded resilient plastics. The resilient surface 7 comprises a layer which is affixed to the rigid cylinder 6. The corresponding two other arms 1b' and 1b of the bellcrank shapes on the other side of the pivot positions 2 are connected by a transverse portion 1c which is provided with a coil which encircles a threaded rod 10 which is mounted on a post 4' of the fishing line reel 3. The rod 10 is provided with knurled nuts 8 and 9 which may be employed for moving the position of the transverse portion 1c and thereby varying tension of the elongate elements 1 and 1' whereby they press the resilient surface 7 against a line 15 wound on a spool 16 of the reel 3. The spring wire is one continuous piece, suitably bent and joined at each end to each side of the shaft 5.

A preferred means of the connection of the elongate spring wire elements 1 and 1' to the shaft 5 for rotatably mounting the cylinder 6 with resilient surface 7 is illustrated in FIG. 1a. The spring wire elements 1 and 1' are bent inwards and are provided with a bent loop 1a at their ends. The loop 1a may be slid into the flattened ends of tubes 30 which are each screwed onto a shaft 31 (5) which passes through the center of a ball race 32. The ball race 32 is located in the cylinder 6 by means of two collars 33 which are each screwed onto internally threaded surfaces of the cylinders 6 and which clamp the ball race 32 between them. The spring wire element 1 and 1' may be easily pulled out of the flattened ends of the tubes 30 to enable easy dismantling.

The soft resilient surface 7 of the cylinder 6 has the properties of appreciable tangential friction against a line 15 wound on a spool 16, as it comprises an expanded plastics material. The expanded material is furthermore sufficiently soft to allow its being depressed to a substantial depth by relatively light force. The elements 1 and 1' apply a gentle pressure to the cylindrical body 6 and maintain this pressure substantially as the line winds off the spool.

It is advantageous for the cylinder 6 with the resilient surface 7 to be as light as practical, in order to reduce to a minimum the rotating inertia of the cylinder.

As shown in FIG. 2 a second pair of spring wire elements 11 may be provided, these supporting a cover 12 and having a similar adjustment for tension by means of a thumb screw 13. A rubber pad 14 (sponge rubber) is interposed between the cover 12 and the arms 1 and 1' of the spring wire elements which mount the cylinder 6 with resilient surface 7. This pad 14 adds downward pressure to the arms 1 and 1' but its more important purpose is to damp vibration of the cylinder 6 and the wire 1, 1' during use. A spring 15' with a washer located around the rod 10 tends to keep the wire 11 up against the thumbscrew 13.

The article for inhibiting tangling is connected to the reel 3 by being mounted on posts 4 and 4'; the second pair of spring wire elements 11 thus provide an additional control over the cylinder 6 such as to eliminate or reduce the bouncing thereof. However the second spring wire elements 11 may be adapted to provide additional pressure between the cylinder 6 and the line 15 on the spool 16 when the heavier line sinkers are used.

It is important that the point of tangency of line 17 from the line 15 wound on the spool 16 is not constrained to a position behind the cylinder as the substance of the resilient surface 7 (for example foam plastics rubber) is then quickly worn, or in an extreme case the cylindrical body might even be lifted off the line 15 wound on the spool 16, and thereby rendered ineffectual.

As shown in FIGS. 3 and 4 an article for inhibiting tangling of the fishing line on a fishing reel in accordance with a further species of the invention is fixed within the body of a fishing line reel 3. The fishing line reel 3 is of the kind provided with covers 20. An arm 19 is enclosed inside each end cover 20, and the two arms 19 are each pivotally mounted at 21, with the end opposite the pivoted end of each arm 19 projecting through an aperture 22 on the inner face of each end cover 20. A dummy shaft 23 has a square section end 21a at both ends, with each fitting into corresponding square holes in each of the arms 19 at the pivot positions 21. One arm 19 has a thumbscrew 24 freely rotatably connected on screw 25 to the pivot 21. An underedge 26 of the thumbscrew 24 is serrated and engages a fixed pawl 27. A stud 28 on the thumbscrew 25 anchors a coil spring 29, with the other end being attached to the pivot 21. The spring 29 thus urges the arms 19 on both sides (as they are connected by the dummy post 23 having square ends 21a) in a direction to apply requisite pressure of the surface 7 of the cylinder 6 onto the lines windings 15 on the spool 16.

As illustrated in FIG. 4 the cylinder 6 is mounted on a ball bearing 32 which is located on shaft 5, with suitable spacers 31 on the shaft 5 and collars 33 in the cylinder 6 to locate the same axially. Each end of the shaft 5 is fitted into the projecting ends of the arms 19.

I claim:

1. An article for automatically inhibiting tangling of fishing line windings on a spool of a fishing line reel by trapping the windings on the spool with a rotatable pressure, comprising a cylinder having a resilient surface of an expanded resilient substance, the length of the cylinder extending in contact across the full width of the windings, spring means which freely rotatably mount the cylinder and are adapted for connection to the reel and for flexibly pressing the resilient surface against the windings when connected to the reel, said spring means comprising spring wire sections adapted to both locate and flexibly press the resilient surface against the windings, said spring wire sections being formed substantially as a pair of bellcranks, the cylinder being freely rotatably connected near the ends of corresponding two arms of the bellcranks to one side of the pivots, and the corresponding two of the bellcranks to the other side of the pivot connected and adjustably located by means including a threaded rod and nut to allow variation of the pressure of the resilient surface against the line windings.

2. An article for inhibiting tangling of fishing line windings on a spool of a fishing line reel by trapping all of the windings on the spool with a rotatable pressure, comprising a cylinder having a resilient surface of an expanded resilient material, the length of the cylinder extending across the full width of the windings, spring means which freely rotatably mount the cylinder, said spring means comprising spring wire sections which both locate and flexibly press the resilient surface against the windings and which sections are formed substantially as a pair of bellcranks, a cover for shielding the cylinder and a second pair of spring wire sections formed as bellcranks supporting said cover.

3. The article as claimed in claim 2 in which the cover includes a padding means of damping material interposed between the cover and the spring wire sections which mount the cylinder.

4. Means for automatically inhibiting tangling of the windings of a fishing line on a fishing reel of the type having side plates, posts interconnecting the side plates and a spool for the line rotatable relative to the side plates, comprising a cylinder having an outer surface of an expanded resilient material, said cylinder having a length extending across the entire width of the line wound on the spool, and means operably related to one of the posts and the cylinder for mounting the cylinder for free rotation and for pressing the outer surface thereof against the windings, said last named means including a length of resilient wire, said length being shaped to form two bellcranks arranged in parallelism with each bellcrank located adjacent a side plate, each of said bellcranks having a coil encircling said one post constituting a pivotal connection between the bellcrank and the side plate, one arm of each bellcrank being connected to the cylinder whereby the cylinder is mounted for free rotation and for pressing the outer surface thereof against the windings, the other arms of the bellcranks being connected by a transverse portion, and means operably connected to said transverse portion and another of said posts for moving the position of the transvers portion thereby varying the tension of the bellcranks and hence the pressure of the outer surface of the cylinder against the windings.